United States Patent

Millar et al.

Patent Number: 5,383,197
Date of Patent: Jan. 17, 1995

[54] LASER AND AN AMPLIFIER

[75] Inventors: Colin A Millar; Michael H. Hunt; Michael C. Brierley, all of Suffolk, England

[73] Assignee: British Telecommunications public limited company, London, England

[21] Appl. No.: 50,165
[22] PCT Filed: Sep. 5, 1991
[86] PCT No.: PCT/GB91/01512
§ 371 Date: Apr. 30, 1993
§ 102(e) Date: Apr. 30, 1993
[87] PCT Pub. No.: WO92/04750
PCT Pub. Date: Mar. 19, 1992

[30] Foreign Application Priority Data

Sep. 5, 1990 [GB] United Kingdom ............... 9019367
Oct. 24, 1990 [GB] United Kingdom ............... 9023186

[51] Int. Cl.⁶ ............................................. H01S 3/30
[52] U.S. Cl. ........................................ 372/6; 372/69; 372/72; 372/75
[58] Field of Search ................. 372/69, 72, 75, 6

[56] References Cited

FOREIGN PATENT DOCUMENTS

WO89/11744 11/1989 WIPO .

OTHER PUBLICATIONS

Electronics Letters, vol. 27, No. 2, 17 Jan. 1991, Whitley et al, pp. 184–186.
Electronics Letters, vol. 26, No. 22, 25 Oct. 1990, Millar et al, pp. 1871–1873.
Electronics Letters, vol. 25, No. 20, Sep. 1989, Tong et al, p. 1390.
Electronics Letters, vol. 26, No. 3, 1 Feb. 1990, Allain et al, pp. 166–168.
Applied Phys. Letters vol. 56, No. 17, 23 Apr. 1990, Allen et al, pp. 1635–1637.
Applied Phys. Letters, vol. 54, No. 10, 6 Mar. 1989, Pollack et al, pp. 869–871.
Electronics Letters, vol. 25, No. 1, 5 Jan. 1989, allain et al, pp. 28–29.

Primary Examiner—Georgia Y. Epps
Attorney, Agent, or Firm—Nixon & Vanderhye

[57] ABSTRACT

An 850 nm laser and/or amplifier comprises a single mode fluoro-zirconate optical fibre (20) doped with $Er^{3+}$. CW operation of the normally self-terminating lasing transition $^4S_{3/2}$ to $^4I_{13/2}$ is achieved by applying excitation energy at 801 nm which both maintains a population inversion between the lasing levels and also populates the upper lasing level by a two-stage process of excitation to the $^4I_{9/12}$ level from the $^4I_{15/2}$ ground state and then to $^2H_{9/2}$ level by ESA.

24 Claims, 4 Drawing Sheets

LASER AND AN AMPLIFIER

This invention relates to lasers and to optical amplifiers.

BACKGROUND OF THE INVENTION

There is growing interest in optical communication systems utilising the 850 nm communications window provided by silica optical fibres.

One known approach to providing optical sources or amplifiers is to use a semiconductor laser as the source of a pump signal for an optical fibre laser or amplifier which then emits or amplifies an optical signals at a wavelength which may be the same as or different to that of the pump. This has the advantage of providing ready access to the signal wavelength in a manner which can take advantage of the relative low cost, high efficiency and commercial availability of laser diodes.

Lasers and amplifiers are known which depend for their operation on lasing transitions between upper and lower lasing levels of ions in a lasing medium each of which lies above the levels of the ions' ground state. If the average lifetime of ions in the upper lasing level (ULL) is longer than the lifetime of ions in the lower lasing level (LLL) then pumping of the laser medium to populate the ULL by excitation of ions from their ground state, perhaps via a level above the ULL, can be employed to maintain a population inversion between the ULL and LLL to allow lasing action to proceed. If, however, the lifetime of the ULL is shorter than the LLL, the lasing transition is known as self-terminating because the build up of ions in the LLL destroys the population inversion between the ULL and LLL required for lasing. Consequently such self-terminating lasers normally only operate in pulsed form, the LLL being given time to empty between pumping pulses.

The applicant's published application WO 89/11744 discloses a fluoro-zirconate optical fibre laser and amplifier in which cw operation of the normally self-terminating transition $^4I_{11/2}$ to $^4I_{13/2}$ is achieved by applying excitation energy to elevate ions from the lower lasing level to maintain a population inversion between the upper and lower lasing levels during lasing.

This use of excited state absorption (ESA) to provide the means of maintaining a population inversion to produce cw lasing eliminates the need to use high dopant concentrations necessary to obtain up-conversion from the LLL by ion-ion energy transfer. Instead, low dopant concentrations can be employed pumped highly efficiently by a laser for example. This is particularly the case if the laser medium comprises a doped optical fibre as the waveguiding properties of the fibre means high power densities can be maintained over large interaction lengths. This is also thermally efficient as the fibre core has a high surface-to-volume ratio.

This arrangement requires the pump means also to provide pump energy at a wavelength and with an intensity sufficient to excite ions from the ground state to the ULL, perhaps via a more energetic level.

With the energy levels of some ions in a particular host, as discussed in the above referenced application, the wavelength and intensity of the pump excitation energy which elevates ions from the LLL can be chosen so that it also coincides with the energy difference between the ground state and an energy level, perhaps the ULL itself, which results in populating the ULL. This provides a much simplified arrangement in that a single wavelength source can be used to pump the ions to the ULL and to depopulate the LLL to prevent saturation. This coincidence of energy levels is not always present, however.

BRIEF DESCRIPTION OF THE EXEMPLARY EMBODIMENT

According to the present invention a optical amplifier comprises:

a medium incorporating lasing ions having an upper and a lower laser level each above the ion's ground state levels, which upper and lower lasing levels form a normally self-terminating laser transition; and a pumping means for applying excitation energy of a suitable wavelength and intensity to elevate ions from the lower lasing level to maintain a population inversion between the upper and lower lasing levels;

CHARACTERISED IN THAT the wavelength and intensity of the excitation energy is also suitable to elevate ions from the ground state levels to the upper lasing level by exciting ions both from the ground state levels to a first energy level and from the first energy level to a second energy level by excited state absorption.

The present invention provides a pumping scheme in which the simple arrangement of a single pump source can be used to provide, simultaneously, depopulation of the lower lasing level and population of the upper lasing level of a dopant ion in which the upper lasing level is at an energy greater than an energy level that can be directly populated from the ion's ground states by absorption of a single photon of the pump signal.

This scheme is equally applicable to lasers employing such amplifiers as a gain medium.

The laser or amplifier may be based on a fluoro-zirconate single mode optical fibre doped with Er$^{3+}$ pumped at around 800 nm. This provides lasing or gain at around 850 nm from the $^4S_{3/2}$ to $^4I_{13/2}$ transition.

It should be appreciated that the pumping scheme of the present invention is applicable generally to dopant ions having suitable energy levels in a given host and is not restricted to any particular combination of host and dopant ion. It may also find application to bulk optic devices or other waveguide such as planar waveguides.

DESCRIPTION OF THE DRAWINGS

The present invention will now be described, by way of example only, the reference for the accompanying drawings of which

DISCLOSURE OF THE PREFERRED EMBODIMENT

Figure 1:
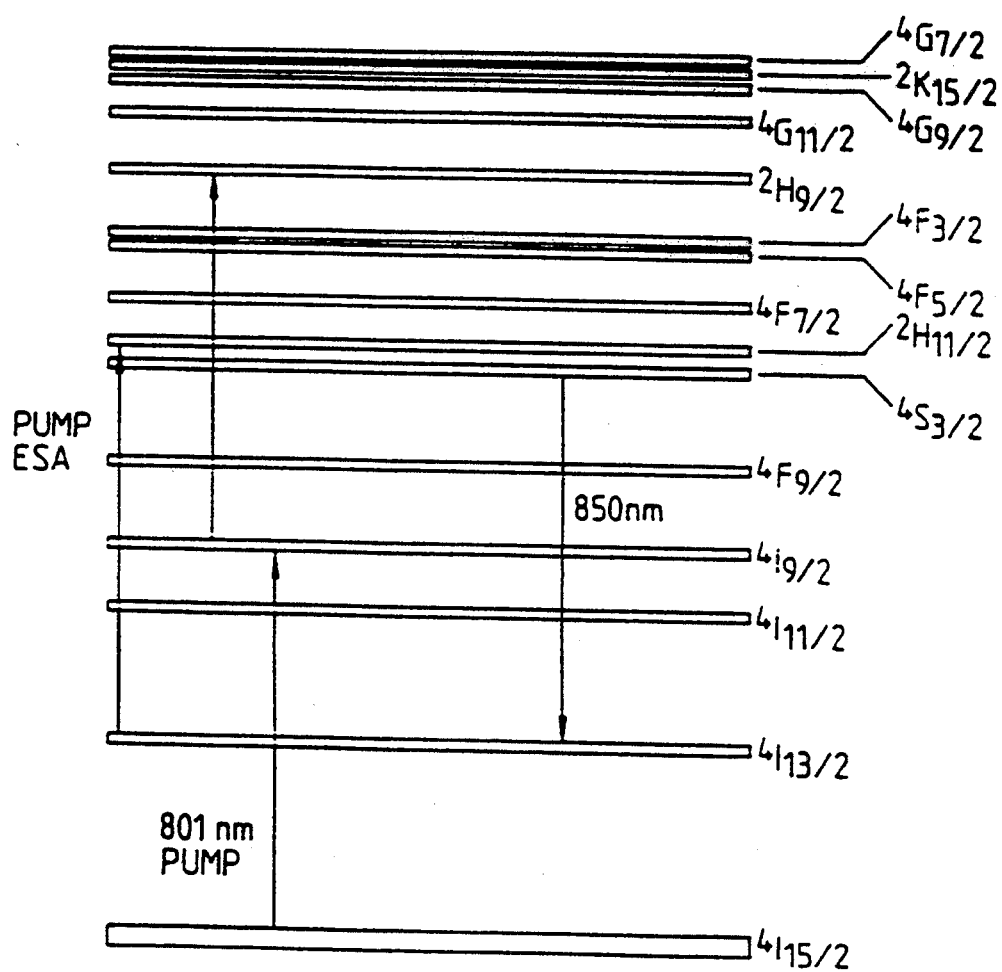
FIG. 1 is an energy level diagram for erbium in a ZBLAN optical fibre showing the relevant laser, fluorescence, and ESA transitions.

Referring to FIG. 1 there is shown the energy level diagram (without an indication of the broadened nature of the bands) of trivalent erbium in a fluoro-zirconate host. The laser to be described with reference to FIG. 2 utilises the ($^4S_{3/2}$ to $^4I_{13/2}$) transition at around 850 nm wavelength. The lower lasing level $^4I_{13/2}$ has a lifetime of about 11 ms which normally makes this lasing transition self-terminating.

Pumping at 801 nm provides depopulation of the $^4I_{13/2}$ level by ESA to the $^2H_{11/2}$ level as well as population of the $^4S_{3/2}$ level by a two stage process, namely excitation to the $^4I_{9/2}$ level from the ground state $^4I_{15/2}$ level followed by ESA to the $^2H_{9/2}$ level.

The pumping scheme provides population of the $^4S_{3/2}$ level even though it is at a higher energy that the $^4I_{9/2}$ level, the highest energy level that can be directly populated from the ground state level by pumping at this wavelength.

Figure 2:
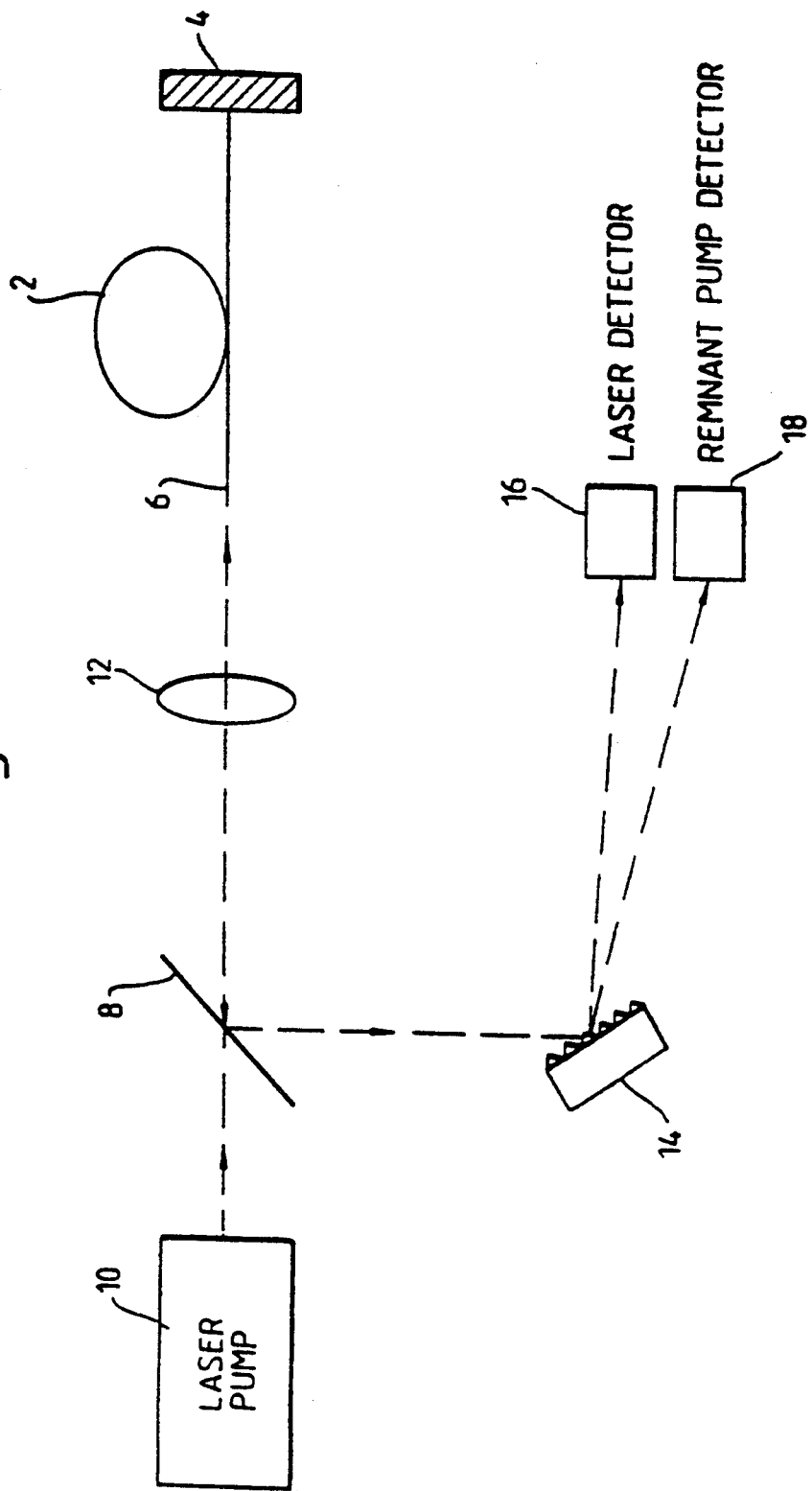
FIG. 2 is a schematic diagram of a laser according to the present invention.

The laser of FIG. 2 comprises an experimental arrangement to determine the operating characteristics of an erbium doped, ZBLAN fibre 2 laser pumped according to the scheme of the present invention. The laser 2 is a 3 meter length of ZBLAN fibre, doped with 500 ppm/wt of erbium in a Fabry-Perot cavity with a 93% reflecting mirror 4 at one end and a cleaved fibre end 6 at the other, giving about 4% reflectivity. The fibre had a V-value of 4.5 at the pump wavelength. An 8% beamsplitter 8 at the input allowed extraction of a fixed proportion of the lasing light from which the output power could be determined. Almost all of the pump energy coupled into the fibre from a Ti:sapphire pumping laser 10 was absorbed. The output from the laser 10 passing to the fibre 2 via the beamsplitter 8 was coupled to the fibre 2 by means of a lens 12.

The remnant pump light, the lasing light and any spontaneous emission were separated using a blazed grating 14 at the output, and the optical power at the lasing and pump wavelengths was measured in a single order by a pair of detectors 16 and 18, respectively. The output power of the laser was then calibrated knowing the losses of the bulk optics and the beamsplitter ratio.

Other pump sources may be used to provide the necessary optical pump power at about 800 nm for such an $Er^{3+}$ doped ZBLAN fibre laser, in particular a semiconductor laser.

Figure 3:
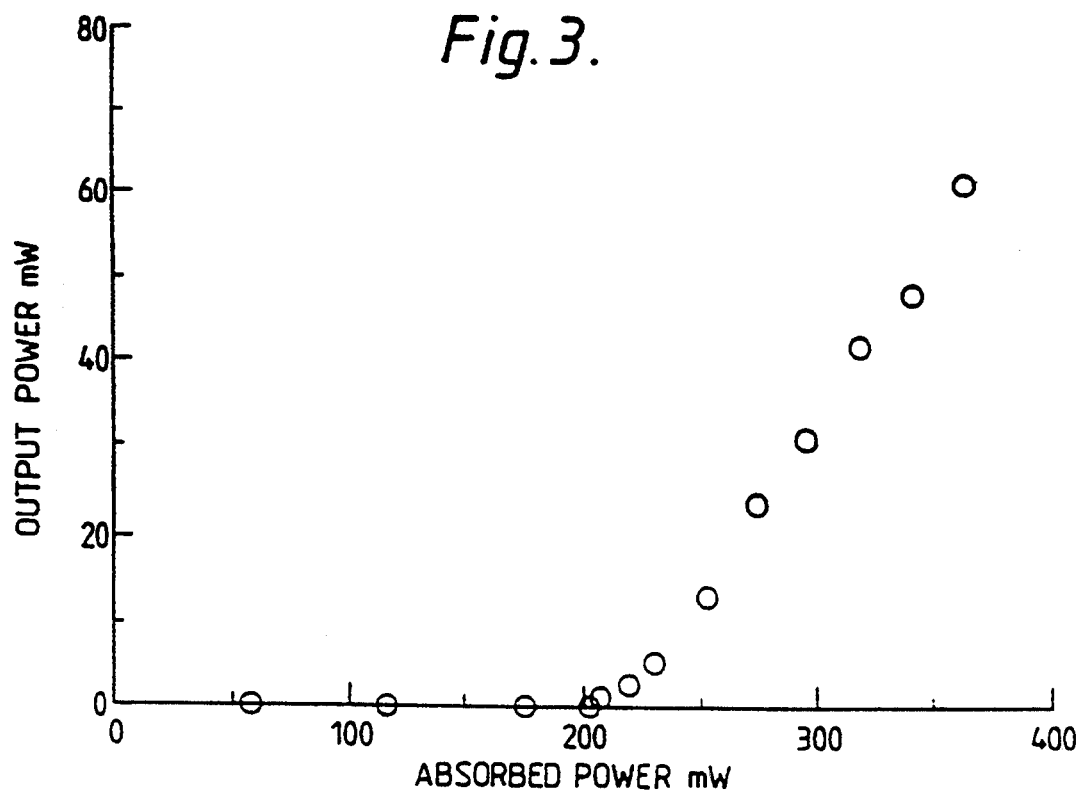
FIG. 3 is a graph showing the laser characteristic of the laser of FIG. 2.

FIG. 3 shows the lasing characteristic of the laser of FIG. 2 when the pump laser 10 was turned to 801 nm. The lasing threshold is high because of the low Q of the cavity, but the slope efficiency is also high at 38%. This is suprisingly efficient for a multiphoton excitation process.

Figure 4:
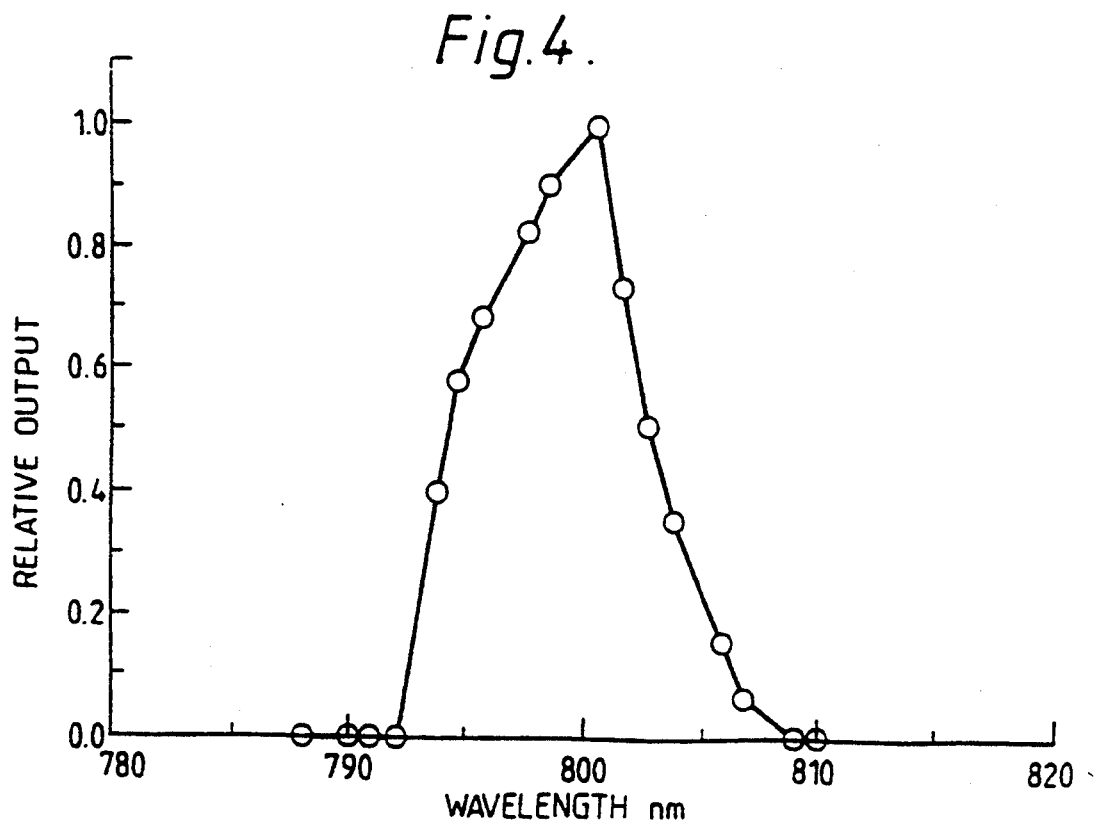
FIG. 4 is a graph of the excitation spectrum for the laser as FIG. 2.

FIG. 4 plots the variation of the relative output power of the laser against the pump wavelength for a constant launched pump power of 396 mW (approx. threshold). The excitation spectrum has a width at the half-power points of 9 nm. This tuning curve follows the bleaching of the ground state transition. The ESA absorption process is therefore strong close to the peak of the ground-state absorption. Detuning the pump laser 10 to 792 nm allowed the population of the $^4I_{11/2}$ level to build up to the extent that lasing on the 3-level transition ($^4I_{11/2}$ to $^4I_{15/2}$) at 980 nm occurred.

Figure 5:
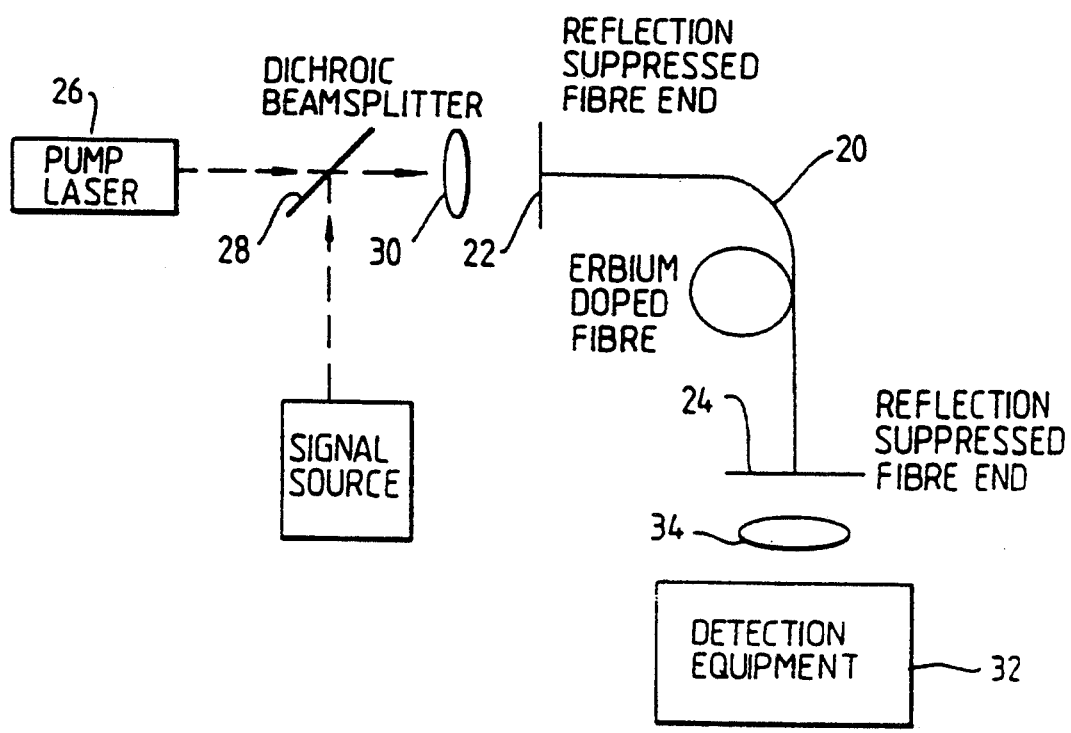
FIG. 5 is a schematic diagram of an amplifier according to the present invention.

FIG. 5 shows schematically an experimental arrangement used to verify the amplification properties of the device in which 3 meter length of ZBLAN fibre 20 doped with 500 ppm/wt of erbium has reflection suppressed fibre ends 22 and 24. A pump laser 26 provides optical pump power at 801 nm which is coupled into the fibre and 22 via a dichroic beam splitter 28 and lens 30. A signal source at 850 nm is also introduced into end 22 of the fibre 20 via the beamsplitter 28 and lens 30. The power of the amplified 850 nm signal exiting fibre end 24 is measured by a detector 32 onto which the signal is focused by lens 34.

Figure 6:
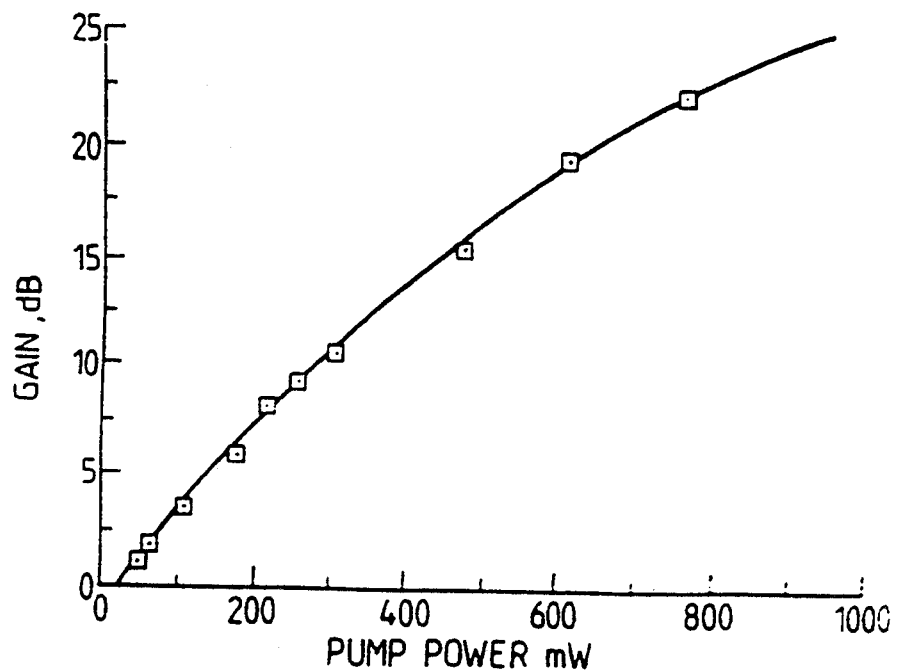
FIG. 6 is a graph of the evolution of gain in the amplifier of FIG. 5.

FIG. 6 shows the evolution of gain at 850 nm with pump power at 801 nm in the device of FIG. 5. The Q of the cavity of FIG. 2 would require a single pass gain to reach a threshold of 7 dB, requiring 200 mW of pump power. This is confirmed from the lasing characteristic of FIG. 3.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. An optical amplifier comprising:
   a medium (20) incorporating lasing ions having an upper and a lower laser level each above the ion's ground state levels, which upper and lower lasing levels form a normally self-terminating laser transition; and
   a pumping means (26) for applying excitation energy of a suitable wavelength and intensity to elevate ions from the lower lasing level to maintain a population inversion between the upper and lower lasing levels;
   CHARACTERISED IN THAT
   the wavelength and intensity of the excitation energy is also suitable to elevate ions from the ground state levels to the upper lasing level by exciting ions both from the ground state levels directly to a first energy level and directly from the first energy level to a second energy level by excited state absorption.

2. An amplifier as claimed in claim 1 in which the medium is an optical fibre waveguide.

3. An amplifier as claimed in claim 2 in which the waveguide is of a fluoro-zirconate glass and the dopant is $Er^{3+}$.

4. An amplifier as claimed in claim 3 in which the waveguide is a ZBLAN fibre doped with approximately 500 ppm/wt $Er^{3+}$.

5. An amplifier as claimed in claim 3 in which the pump wavelength is about 801 nm.

6. An amplifier as claimed in claim 1 in which the pumping means is a semiconductor laser.

7. A laser comprising:
   a resonant cavity (2, 4, 6) including a medium (2) incorporating lasing ions having an upper and a lower laser level each above the ion's ground state levels, which upper and lower lasing levels form a normally self-terminating laser transition; and
   a pumping means (10) for applying excitation energy of a suitable wavelength and intensity to elevate ions from the lower lasing level to maintain a population inversion between the upper and lower lasing levels;
   CHARACTERISED IN THAT
   the wavelength and intensity of the excitation energy is also suitable to elevate ions from the ground state levels to the upper lasing level by exciting ions both from the ground state levels directly to a first energy level and directly from the first energy level to a second energy level by excited state absorption.

8. A laser as claimed in claim 7 in which the medium is an optical fibre waveguide (2).

9. A laser as claimed in claim 8 in which the waveguide (2) is of a fluoro-zirconate glass and the dopant is $Er^{3+}$.

10. A laser as claimed in claim 9 in which the waveguide is a ZBLAN fibre doped with approximately 500 ppm/wt $Er^{3+}$.

11. A laser as claimed in claim 9 in which the pump wavelength is about 801 nm.

12. A laser as claimed in claim 7 in which the pumping means (10) is a semiconductor laser.

13. A method of amplifying an optical signal, the method including the step of:
providing optical energy to optically pump a medium incorporating lasing ions having an upper and a lower lasing level, each level being above the ground state levels of the ions, which upper and lower lasing levels form a normally self-terminating laser transition, the pump energy being of suitable wavelength and intensity both to elevate ions from the lower lasing level to maintain a population inversion between the upper and lower lasing levels, and to elevate ions from the ground state levels to the upper lasing level by exciting ions from the ground state levels directly to a first energy level and directly from the first energy level to a second energy level by excited state absorption.

14. A method of producing laser emission, the method including the step of providing optical energy to optically pump lasing ions of a medium in a resonant cavity, the lasing ions having an upper and a lower lasing level each above the ground state levels of the ions, which upper and lower lasing levels form a normally self-terminating laser transition, the pump energy being of suitable wavelength and intensity both to elevate ions from the lower lasing level to maintain a population inversion between the upper and lower lasing levels, and to elevate ions from the ground state levels to the upper lasing level by exciting ions from the ground state levels directly to a first energy level and directly from the first energy level to a second energy level by excited state absorption.

15. A method as in claim 13, in which the medium is an optical fibre waveguide.

16. A method as in claim 15, in which the waveguide comprises a fluorozirconate glass doped with $Er^{3+}$.

17. A method as in claim 16, in which the waveguide is a ZBLAN fibre doped with approximately 500 ppm/wt $Er^{3+}$.

18. A method as in claim 16, in which the wavelength of the optical pump energy is about 800 nm.

19. A method as in claim 13, wherein the optical pump energy is provided by a semiconductor laser.

20. A method as in claim 14, in which the medium is an optical fibre waveguide.

21. A method as in claim 20, in which the waveguide comprises a fluorozirconate glass doped with $Er^{3+}$.

22. A method as in claim 21, in which the waveguide is a ZBLAN fibre doped with approximately 500 ppm/wt $Er^{3+}$.

23. A method as in claim 20, in which the wavelength of the optical pump energy is about 800 nm.

24. A method as in claim 14, wherein the optical pump energy is provided by a semiconductor laser.

* * * * *